Figure 4:
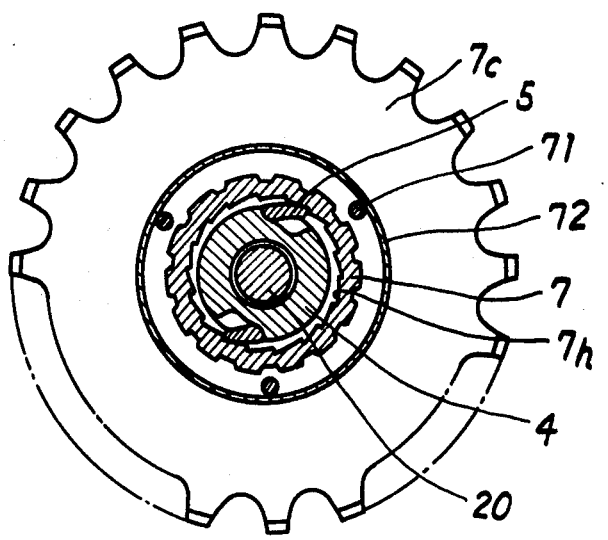

United States Patent [19]

Segawa

[11] 4,145,095
[45] Mar. 20, 1979

[54] HUB WITH FREE WHEEL FOR A BICYCLE

[75] Inventor: Takashi Segawa, Sakai, Japan

[73] Assignee: Shimano Industrial Company Limited, Osaka, Japan

[21] Appl. No.: 888,635

[22] Filed: Mar. 21, 1978

Related U.S. Application Data

[63] Continuation of Ser. No. 702,207, Jul. 2, 1976, abandoned.

[30] Foreign Application Priority Data

Jul. 10, 1975 [JP] Japan .................................. 50-84991
Jun. 14, 1976 [JP] Japan .................................. 51-70045

[51] Int. Cl.² ............................................ F16C 33/00
[52] U.S. Cl. ................................. 308/192; 74/217 B; 301/105 B
[58] Field of Search ............... 308/192, 210, 191, 211, 308/183, 190; 301/105 B; 74/217 R, 217 B, 594.2

[56] References Cited

U.S. PATENT DOCUMENTS 1,981,399  11/1934  Thomson ............................ 308/192

FOREIGN PATENT DOCUMENTS 827079  1/1938  France .................................. 301/105 B
890064  10/1943  France .................................. 308/192

Primary Examiner—Douglas C. Butler
Attorney, Agent, or Firm—Stevens, Davis, Miller & Mosher

[57] ABSTRACT

A unit hub for a bicycle providing a bearing cone which is formed integrally with an end member extending axially from one end of a hub body, which bearing cone is provided at its root with an extension and defines a ball race carrying balls for supporting therewith one end of a drive member. The bearing cone is also provided at a middle portion of the extension with pawls and is screwed at the fore end to a bearing ring having a ball race carrying balls for supporting the other end of the drive member. The hub has fewer parts than known unit hubs, is more easily assembled and is smaller in size.

4 Claims, 5 Drawing Figures

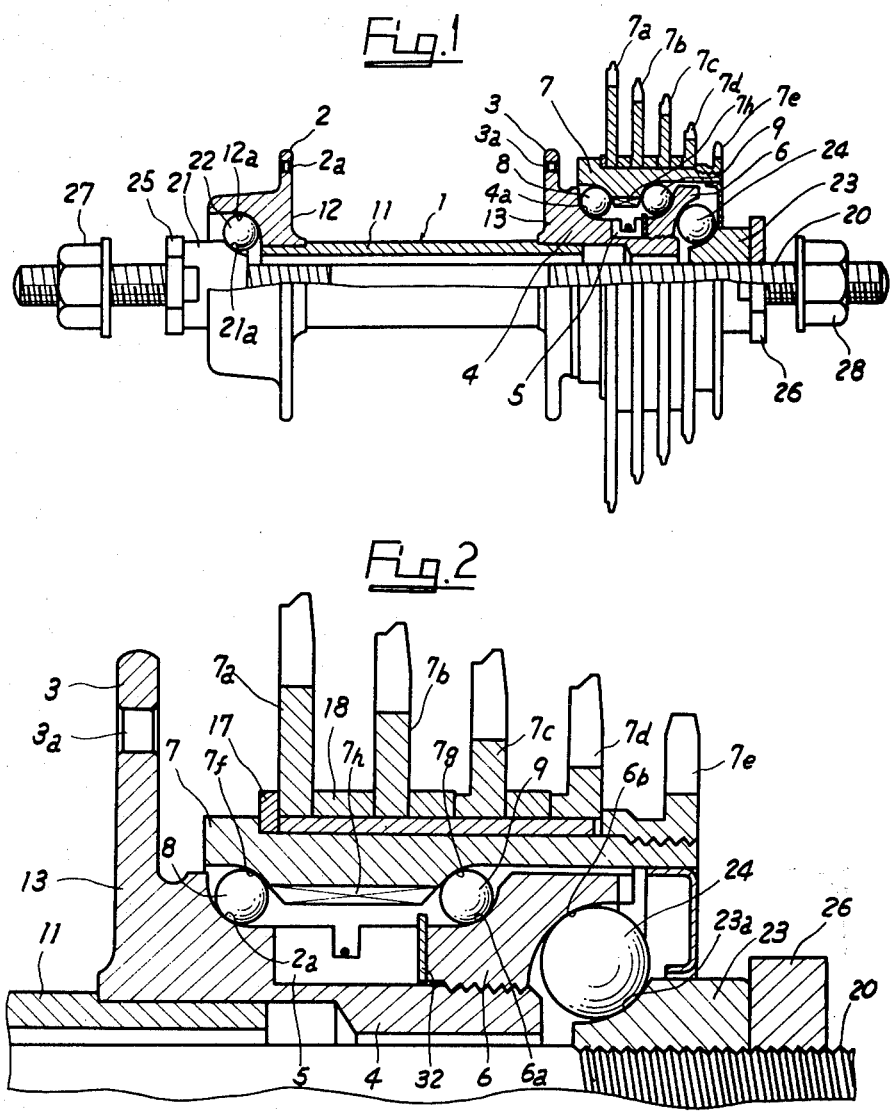

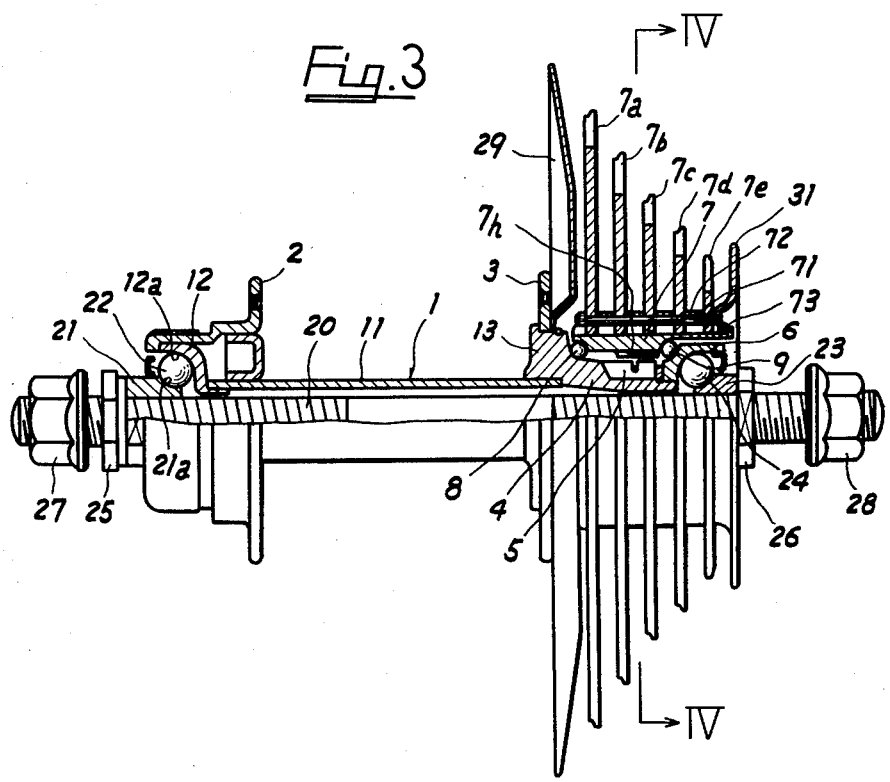

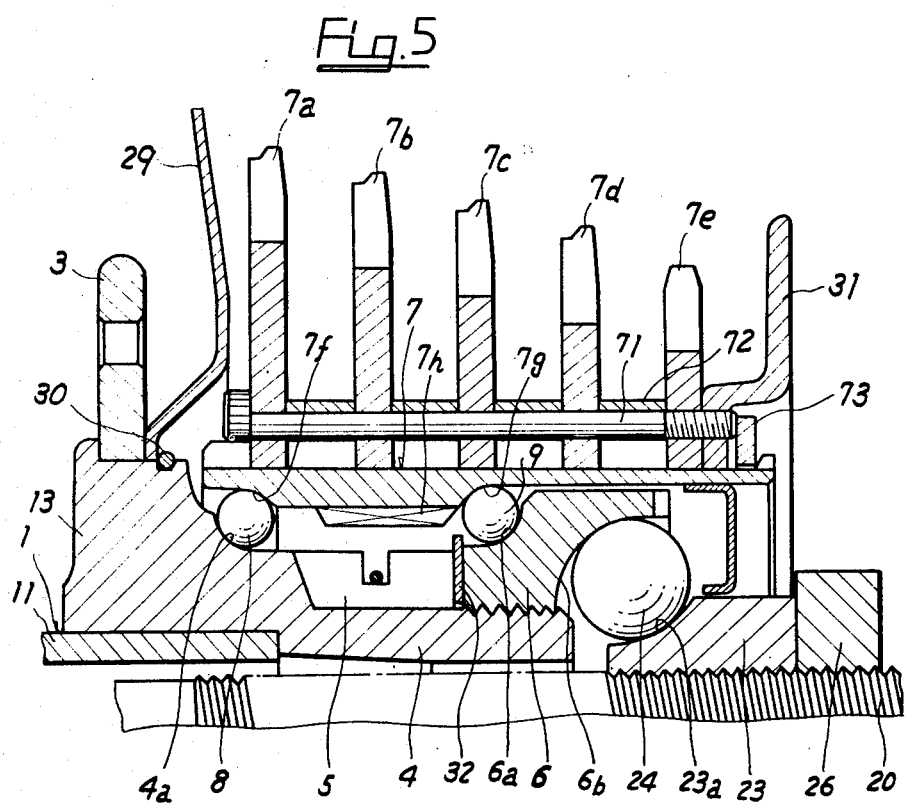

HUB WITH FREE WHEEL FOR A BICYCLE

This is a continuation of application Ser. No. 702,207 filed July 2, 1976, now abandoned.

This invention relates to a unit hub for a bicycle and more particularly to a unit hub comprising a rear hub combined with a free-wheel of the bicycle.

Generally, the bicycle's running is so performed that a rear wheel is forced to be rotated by the drive force transmitted by pedalling the free-wheel attached to the rear hub from a a front chain wheel through a drive chain pulled therebetween.

The free-wheel is, as well known, assembled with the rear hub in two ways: 1) an independently formed free-wheel is screwed through its inner ring with the rear hub and 2) the hub is, as in the invention, pre-fabricated with the freewheel.

The hub formed the latter way is the so-called unit hub. This kind of unit hub is assembled in such a manner that the hub body is screwed with an inner ring having pawls, and the inner ring is fitted with a drive member having at its interior, ratchet teeth in mesh with the pawls, and at the exterior, one or more sprocket wheels, so that the drive member may be unidirectionally rotatably supported to the inner ring through a pair of bearings screwed to the inner ring and balls carried therewith.

However, the conventional unit hub has hitherto had problems in that the large number of parts thereof cause trouble in assembly and the drive member is restricted in its diameter from being under a given range.

The invention has been designed to solve the aforesaid problems concerning the unit hub.

A main object of the invention is the provision of a unit hub for a bicycle, which has fewer parts and is simple in construction.

Another object is the provision of a unit hub which is composed of: a hub body tempered to a predetermined hardness; and a bearing cone (corresponding to a conventional inner ring), integrated with the hub body, whose ball race has a finely finished surface, while, supports for the rear wheel's spokes are made strong enough to bear impact from the spokes.

The invention is characterized in that, first, the hub body rotatably supported to the hub shaft is extended at its one end to form an inner ring integrally with the hub body, which inner ring (to be herein called the bearing cone) has hitherto been independent therefrom and at the bearing cone is formed a ball race receiving balls for supporting therewith one axial end of the drive member, and, second, the aforesaid hub body is provided with the spoke supports formed independently therefrom.

As a result of the first characteristic, the unit hub of the invention has fewer parts, is easy to assembly, and is of a small size by reducing a diameter of the drive member to be attached thereto with sprocket wheels of small pitch diameters.

As a result of the second characteristic the hardness of the spoke supports can be lowered although the hub body is highly hardened so that the supports may be free from cracking even when subjected to impact from the spokes.

The cracking is caused because the hub body, which is integrated with the bearing cone whose extension has its root the ball race, is required to be hardened in order to provide the ball race with adequate hardness. Such highly hardened spoke supports are occasionally subject to impact from the spokes which can result in cracking at the support during the bicycle's running.

From this, it is necessary for the spoke supports to be only annealed. However, there is a problem that the annealing accompanies a hard process and undesirable manufacturing efficiency due to the location of the spoke supports which is close to the ball races respectively. This problem is completely solved by the second characteristic.

The abovementioned objects and features of the invention and others will be clarified in the following description in accordance with the accompanying drawings, in which:

FIG. 1 is a front view of the unit hub of the invention shown with a first embodiment, FIG. 2 is an enlarged section showing only the principal portion of the unit hub in FIG. 1, FIG. 3 is a partially cutaway front view of a second embodiment of the invention, FIG. 4 is a section taken on line IV—IV in FIG. 3, and FIG. 5 is an enlarged section enlarging only the principal portion of FIG. 3.

Referring to FIG. 1, the numeral reference 1 designates a hub body rotatably supported to a hub shaft 20. The hub body 1 comprises a tube 11 and end members 12 and 13 provided with spoke supports 2 and 3 respectively. Although the tube 11 and members 12 and 13 are shown in FIG. 1 as three separate components, the tube 11 may be integrated with the two end members 12 and 13.

In either aforesaid construction, the end member 13 at one axial end of the hub body 1 is axially outwardly extended to a given extent to form a bearing cone 4 integral therewith. The bearing cone 4 is provided at its outer periphery with a ball race $4a$ and outwardly adjacent thereto with pawls 5 meshable with ratchet teeth $7h$ of the drive member to be hereinafter described, and further outwardly adjacent thereto with a screw thread to be screwed with a bearing ring 6 having at both its outer and inner surfaces ball races $6a$ and $6b$ respectively.

The numeral reference 7 designates a drive member having, at its inner periphery, ratchet teeth $7h$ in mesh with the pawls 5 and having at the outer periphery, sprocket wheels $7a$ through $7e$ attached thereto.

A five stage free wheel composed of five sprocket wheels is shown in the drawings. However, a single stage free wheel of one sprocket may similarly be available for assembly such that the drive member 7 and the one sprocket are integrated as the single stage freewheel. Alternatively each of sprockets may, as in the multi-stage freewheel, be fitted onto the drive member 7.

Each of the sprocket wheels preferably has a pitch of less than 12.7mm, and desirably 8.5 to 11.5mm; is reduced in its pitch diameter proportionally to the existing sprocket of pitch of ½ in. (12.7mm); and has a tooth width of the predetermined value reduced by a reduction ratio greater than that of the abovementioned pitch diameter. Briefly, a sprocket of ⅜ in. (9.525 mm) pitch and with 12 teeth can be reduced in pitch diameter until 36.80 mm, that is, 25 percent reduction of the pitch diameter as compared with the conventional one of ½ in. (12.7mm) pitch.

The five sprocket wheels $7a$ through $7e$ as shown in FIG. 1, whose teeth numbers are 14 at the minimum sprocket $7e$, 17, 16 and 15 at medium ones respectively and 18 at the maximum one 7a, have pitch diameters such as 37.73mm for the sprocket 7e and 40.73mm at the next larger one 7d. Hence the smaller diameter member 7 can carry the sprocket wheels 7a through 7e of reduced pitch diameter.

Thus formed, the sprocket wheels 7a through 7e are mounted to the drive member 7 in such a manner that the drive member 7 is provided, at the outer periphery of the axially outward end thereof, with a screw thread and is provided at the axially inward end, with a circlip 17. The sprockets sequentially from the maximum one 7a are spaced from each other by collars. The minimum one 7e is finally screwed with the screw thread.

The drive member 7 has ball races 7f and 7g axially adjacent to both sides of the pawls 5, and between the ball race 7f and the ball race 4a of the bearing cone 4 and between the ball race 7g and the ball race 6a of the outer surface of the bearing ring 6, are inserted balls 8 and 9 respectively, so that the drive member 7 may be supported with the bearing cone 4 and the bearing ring 6 in unidirectional rotatable relation therewith.

The drive member 7 is mounted to the bearing cone 4 in the following order: first the drive member 7 is fitted onto the outer periphery of the bearing cone 4, the ratchet teeth 7h of the drive member 7 are meshed with each of the pawls 5, and then the bearing ring 6 is screwed to the outer thread of the bearing cone 4 so that the undirectional rotation of the drive member 7 is conveyed to the bearing cone 4 through the ratchet teeth 7h and the pawls 5 thereby rotating the hub body 1. The reverse rotation of the same is free.

The hub body 1 constructed as aforesaid is rotatably supported at one axial end to one axial end of the hub shaft 20 through balls 22 inserted between a ball race 12a of the other end member 12 and a ball race 21a of a ball holder 21 screwed to one axial end of the hub shaft 20, and is rotatably supported at the other axial end to the other axial end of the hub shaft 20 through balls 24 inserted between the ball race 6b of the bearing ring 6 and the ball race 23a of a ball holder 23 screwed to the other end of the hub shaft 20.

Although the aforesaid unit hub is formed with the end members 12 and 13 integrated with the spoke supports 2 and 3, it is preferable to form the latter independently of the former.

In greater detail, the hub body 1, especially of which the aforesaid end member 13 has the ball race 4a and the end member 12 has, as shown in FIGS. 1 and 3, the ball race 12a, is hardened to form both the ball races 4a and 12a of a predetermined hardness. Hence, the integration of the spoke supports 2 and 3 with the end members 12 and 13 respectively causes the former to be high in hardness resulting in occurrence of cracking. However, since the supports 2 and 3 are, as shown in FIGS. 3 and 5, separated from the end members 12 and 13, they can be free from cracking because of being finished unhardened.

The aforesaid spoke supports 2 and 3 are circumferentially provided with spoke-mount bores 2a and 3a respectively. The support 2 is formed in a cylinder to be sleeved onto the outer periphery of the end member 12 by pressing and similarly the support 3 of a disc shape is pressed onto the end member 13.

Thus, the hub body 1, which is formed of the end member 13 separately from the spoke support 3, may, when produced by die casting, be easy to manufacture because there are less projecting portions thereof and further the spoke support does not need to be hardened.

The support 3 can be primarily molded integrally with the bearing ring 6 from a single piece of material. The members 3 and 6 so molded together can the be separated from each other by an intermediate process easily form the support 3.

In addition, the sprocket wheels may, as shown in FIGS. 3 and 4, be mounted to the drive member in a wheel block which connects each of the sprocket wheels 7a to 7e through a bolt 71 in integrally detachable relation with the drive member.

In greater detail, the sprocket wheels 7a to 7d are formed with through holes adjacent to the inner periphery thereof and the minimum sprocket wheel (for high speed) 7e is provided adjacent to the inner periphery thereof with a threaded hole. Each of the sprockets 7a to 7e is spaced with a collar 72 inserted therebetween. The bolt 71 is inserted into the through holes from the maximum sprocket 7a (for low speed) side and is screwed at the tip with the minimum sprocket 7e. Thus, each of the sprocket 7a to 7e is integrated with each of the others to from the wheel block. The wheel block is inserted onto the drive member 7 from one end thereof and held with a snap ring 73.

Additionally, in the drawings the numeral references 25 and 26 designate lock nuts for the ball holders 21 and 23, and 27 and 28 are nuts for fixing the hub shaft 20 to a bicycle frame (not shown). In FIGS. 3 and 5, the numeral reference 29 is a spoke protector attached to the end member 13 adjacent to the spoke support 3 through a snap ring 30. 31 is a chain guard attached outward of the minimum sprocket wheel 7e in the same manner through the bolt 71, and 32 is a spacer for the bearing ring 6.

As is clearly understood from the aforesaid description, the unit hub of the invention has the hub body integrated with the bearing cone unidirectionally supporting therewith the drive member and the bearing cone is formed of the ball race carrying therewith one axial end of the drive member, whereby the unit hub has fewer parts, is easy to assemble, and is of small size as a whole due to the smaller diameter of the drive member and the accompanying smaller pitch diameters of the sprocket wheels attached thereto.

Furthermore, the spoke supports formed separately from the hub body are fixed thereto so that the hub body may facilitate manufacturing and also, even though the hub body is highly hardened in order to form the ball race at the bearing cone integrated with the hub body, the spoke supports can be so separated that they are kept low in hardness, whereby the spoke supports become free from cracking caused by impact from the spokes in the bicycle's running.

While various embodiments of the invention have been shown and described, the invention is not limited to the specific construction thereof, which is merely exemplified in the specification rather than is defined.

What is claimed is:

1. A unit hub for a bicycle, said hub comprising:
   a hub shaft;
   a hub body rotatably supported by said hub shaft, said hub body comprising a tube of a given length and two separate end members;
   one of said two end members defining a bearing cone at one axial end of said hub body, said bearing cone comprising an extension having an intermediate portion and an end portion extending from a root portion thereof and terminating in said end, said bearing cone further comprising:

a ball race at the root portion of the extension thereof, a threaded portion on the outer periphery of the end of the extension thereof, and pawls on the intermediate portion of the extension intermediate the root portion and the end thereof;

a bearing ring screwed onto the threaded portion of the end of the bearing cone, said bearing ring having a ball race on the outer periphery of one axial end thereof;

a drive member sleeved onto the outer periphery of the bearing cone and bearing ring and being unidirectionally rotatably supported with respect thereto, said drive member having:

at least one sprocket wheel on the outer periphery thereof, ratchet teeth on the inner periphery thereof, in mesh with said pawls, and ball races at each axial end of the ratchet teeth with balls; and a ball holder with balls screwed onto each end of said hub shaft, said drive member being supported through balls positioned between said ball races thereon and said ball races on said bearing cone and on said bearing ring so that said hub body carrying said drive member therewith is rotatably supported with respect to said hub shaft by said ball holders screwed thereto and said balls, both of said ball races and balls supporting said drive member being disposed axially inwardly of said ball holders and balls screwed onto said hub shaft.

2. A unit hub for a bicycle as claimed in claim 1, further comprising:

a separate spoke support on at least one of said end members of said hub body.

3. A unit hub for a bicycle as claimed in claim 1, wherein:

said bearing cone extension extends in a direction away from said one axial end of said hub body.

4. A unit hub for a bicycle, said hub comprising:

a hub shaft;

a hub body rotatably supported by said hub shaft, said hub body comprising a tube of a given length and two separate end members;

one of said two end members having a bearing cone at one axial end of said hub body, said bearing cone comprising an extension having an intermediate portion and an end portion extending from a root portion thereof in a direction away from said one axial end of said hub body and terminating in said end, said bearing cone further comprising:

a ball race at the root portion of the extension thereof, a threaded portion on the outer periphery of the end of the extension thereof, and pawls on the intermediate portion of the extension intermediate the root portion and the end thereof;

a bearing ring screwed onto the threaded portion of the bearing cone, said bearing ring having a first ball race on the outer periphery of one axial end thereof and a second ball race on the inner periphery thereof;

the other one of said two end members having a ball race on the inner periphery thereof;

a drive member sleeved onto the outer periphery of the bearing cone and bearing ring and being unidirectionally rotatably supported with respect thereto, said drive member having:

at least one sprocket wheel on the outer periphery thereof, ratchet teeth on the inner periphery thereof, in mesh with said pawls, and ball races at each axial end of the ratchet teeth;

a pair of ball holders screwed onto said hub shaft, each of said ball holders having a ball race on the outer periphery thereof;

first balls positioned between said ball races on said drive member and said ball race on said bearing cone and said first ball race on said bearing ring; and second balls positioned between said ball races on said ball holders and said ball race on said other one of said two end members and said second ball race on said bearing ring so that said hub body carrying said drive member therewith is rotatably supported with respect to said hub shaft, both of said ball races and balls supporting said drive member being disposed axially inwardly of said ball holders and balls screwed onto said hub shaft.

* * * * *

REEXAMINATION CERTIFICATE (1083rd)
United States Patent [19]
Segawa

[11] B1 4,145,095
[45] Certificate Issued   Jun. 27, 1989

[54] HUB WITH FREE WHEEL FOR A BICYCLE

[75] Inventor: Takashi Segawa, Sakai, Japan

[73] Assignee: Shimano Industrial Company Limited, Osaka, Japan

Reexamination Request:
   No. 90/000,957, Feb. 14, 1986

Reexamination Certificate for:
   Patent No.: 4,145,095
   Issued: Mar. 20, 1979
   Appl. No.: 888,635
   Filed: Mar. 21, 1978

Related U.S. Application Data
[63] Continuation of Ser. No. 702,207, Jul. 2, 1976, abandoned.

[30] Foreign Application Priority Data
   Jul. 10, 1975 [JP] Japan .................. 50-84991
   Jun. 14, 1976 [JP] Japan .................. 51-70045

[51] Int. Cl.⁴ .............................................. F16C 33/00
[52] U.S. Cl. ...................................... 384/545; 192/64; 301/105B; 474/160
[58] Field of Search .......... 384/545, 544, 543, 515, 384/490, 461, 458, 457, 456, 453, 449; 192/64, 46; 301/105 B; 474/160, 158

[56]      References Cited
         U.S. PATENT DOCUMENTS
   2,211,548  8/1940  Schwinn ................ 192/64
   2,489,934  11/1949 Schwinn ................ 192/64

FOREIGN PATENT DOCUMENTS
   405942   11/1934  Belgium .
   1155355  10/1963  Fed. Rep. of Germany .
   890064    1/1944  France .
   976900    3/1951  France .
   1186656   8/1959  France .
   1411457   8/1965  France .
   33-6122   4/1958  Japan .
   43-17310  7/1968  Japan .
   50-5172   2/1975  Japan .
   233074    9/1944  Switzerland .
   586803    4/1947  United Kingdom .

OTHER PUBLICATIONS
Japanese Industrial Standard D9419 (1963) (with translation).

Primary Examiner—Thomas R. Hannon

[57]                ABSTRACT

A unit hub for a bicycle providing a bearing cone which if formed integrally with an end member extending axially from one end of a hub body, which bearing cone is provided at its root with an extension and defines a ball race carrying balls for supporting therewith one end of a drive member. The bearing cone is also provided at a middle portion of the extension with pawls and is screwed at the fore end to a bearing ring having a ball race carrying balls for supporting the other end of the drive member. The hub has fewer parts than known unit hubs, is more more easily assembled and is smaller in size.

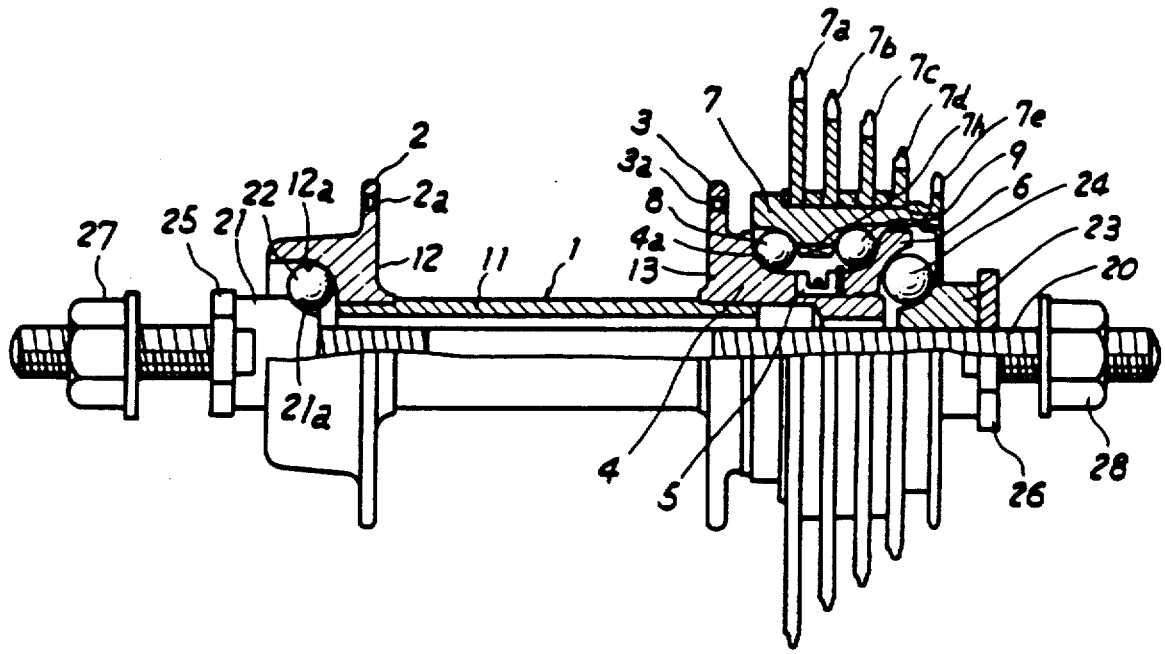

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are cancelled.

* * * * *